Figure 1:
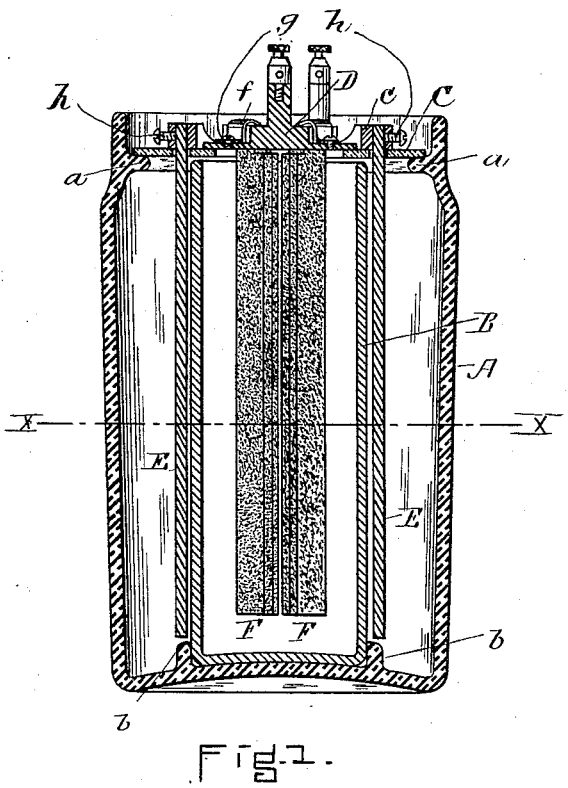

(No Model.)

A. J. MacDONALD.
GALVANIC BATTERY.

No. 428,116. Patented May 20, 1890.

WITNESSES.
Frank G. Parker.
Matthew M. Blunt.

INVENTOR.
Archibald J. MacDonald
by his attorney
Alex. L. Hayes.

UNITED STATES PATENT OFFICE.

ARCHIBALD J. MacDONALD, OF NORTH TIVERTON, RHODE ISLAND, ASSIGNOR TO HENRY E. TOWNSEND, TRUSTEE, OF BOSTON, MASSACHUSETTS.

GALVANIC BATTERY.

SPECIFICATION forming part of Letters Patent No. 428,116, dated May 20, 1890.

Application filed August 24, 1889. Serial No. 321,847. (No model.)

*To all whom it may concern:*

Be it known that I, ARCHIBALD J. MACDONALD, of North Tiverton, in the county of Newport and State of Rhode Island, have invented a new and useful Improvement in Galvanic Batteries, of which the following, taken in connection with the accompanying drawings, is a specification.

The objects of this invention are: increase in the constancy and diminution in the internal resistance of the battery, a more perfect contact of the negative plate with the conducting-wire and prevention of the interruption of the circuit at that point, securing a tight cover for the cell, and the prevention of the position of the plates and of the porous cup from being disturbed by removing or agitating the cell.

To these ends the invention consists, first, in the arrangement, substantially as hereinafter more fully set forth, of the negative plates in relation to the positive plates, whereby nearly the entire surfaces of the negative plates are utilized as negative surfaces, thereby diminishing the tendency to polarization and consequently increasing the constancy of the battery, and whereby each positive surface is at the same distance from a negative surface; second, in the arrangement, substantially as hereinafter more fully set forth, upon a disk of hard rubber, which rests upon a flange in the internal surface of the cell near the top of the same, of two metallic holders for the plates, the holder for the positive plates being a ring of metal having slots therein at equal distances apart for the insertion of the ends of the positive-plates, and the holder for the negative plates being a disk of metal which is separated from the metal ring and has upon it a cross-shaped raised part provided with slots at equal distances apart for the insertion of the extremities of the negative plates; third, in the combination, substantially as hereinafter more fully set forth, with the cell, of an internal flange on the inside surface near the top for supporting the cover and a ring or series of projections arranged in a circular form on the bottom of the cell for surrounding the base of the porous cup.

I have shown and described my invention as applied to a double-fluid battery provided with a porous cup for containing the negative plate, and to that form of double-fluid battery in which the negative plates are made of carbon and the positive plates of zinc; but the principle of my invention can be carried into effect in other forms of batteries where there is no porous cup and where other substances are used for the negative and positive plates.

Figure 2:
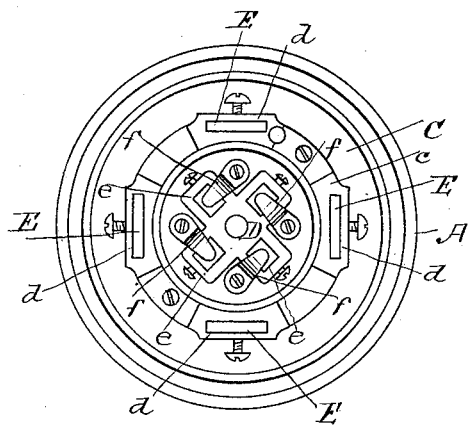
Figure 3:
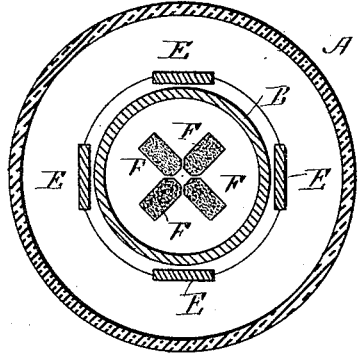

In the accompanying drawings, Figure 1 is a vertical sectional view of my battery. Fig. 2 is a plan view of the cover for the same; and Fig. 3 is a sectional view on the line X X, Fig. 1.

In the several figures the same letters refer to the same parts.

Referring to the drawings, A is the inclosing-cell, which is preferably made of glass, but may be made of earthenware or any other suitable material. On the inner surface of this cell near the top is a flange $a$, and on the inner surface of the bottom of the cell is a circular projection $b$, or a series of projections arranged in a circle.

B is the porous cup, the base of which fits within this ring $b$ or series of projections. By this means the porous cup is held in place and prevented from moving when the cells are moved or agitated. This porous cup is of such height that when in position the cover rests upon it.

C is the cover, made of hard rubber and resting upon the flange $a$.

$c$ is a ring of metal, which is secured to the upper surface of this cover and is provided with four longitudinal slots $d\ d$, arranged therein at equal distances from one another for the reception of the ends of the zincs. Within the ring, but separated from it, is a disk of metal D, having upon it a raised portion made in the form of a Greek cross. In each of the arms of this cross is a slot $e\ e$, and in each slot the end of a carbon is inserted. Both the carbon plates and zinc plates are secured to the metallic holders $D^\times$ $c$ by set-screws $g\ h$. Attached by one end to the metal disk at the side of each of the arms of the cross is a flat spring of platinum or platinized metal $f$, the other end of which bears upon the end of the carbon rod projecting through the slot in the arm near which the strip is secured. To the center of this cross-shaped piece is secured the ordinary binding-screw for holding the conducting-wire, and to the ring c is secured another binding-screw for holding the other conducting-wire. Contact is established between the plates and their holders by means of the set-screws, which firmly secure the plates against the walls of the slots. This contact will be sufficient for the positive plates; but for the negative plates I use, in addition, the platinum or platinized springs. Connection between the carbon plate and the conducting-wire is often interrupted by salts formed upon the carbon by what is known as "creeping," and which oxidize the connections. I therefore make use of the springs of platinum or platinized metal, which are not affected by the deposition of salts, and thus am enabled to maintain a perfect contact.

E E are the zinc plates, which are four in number and are arranged about the porous cup at equal distances apart, and are placed so that their surfaces are tangent to the cylindrical porous cup. The carbon plates F F are also four in number and are rectangular in cross-section. They are united together and opposed to one another at one side, so that a section through the plates as thus united presents the form of a Greek cross, as shown in Fig. 3, and the sides which are united and opposed are beveled off. They are so arranged in relation to the zinc plates that each zinc plate is opposite to the angle formed by the faces of the two pairs of carbons, as shown above in Fig. 3. It will thus be seen that nearly the entire surface of each carbon is available for a negative surface, and that each surface is at the same distance from the positive plate. In this way the largest amount of surface is rendered available, internal resistance is diminished, and the use of material is economized. This principle of construction may also be used where there is only one positive plate and two negative plates.

Having thus described my invention, what I claim, and desire to secure by Letters Patent of the United States, is—

1. In a primary battery, the arrangement, substantially as shown, of the positive plates opposite the angle formed between the surfaces of two negative plates, said positive and negative plates being separated from each other by a porous cup, for the purpose set forth.

2. In a primary battery, the combination, substantially as and for the purpose set forth, of four negative plates united at a common center and arranged so that a transverse section through the same is in form of a cross, with four positive plates, each arranged on the outside of a circular porous cup opposite the angle formed by the arms of the cross.

3. The combination, substantially as and for the purpose set forth, of four carbon rods rectangular in section, united at a common center, beveled at their joining sides, and arranged so that a transverse section through the same is in the form of a cross, with four zinc plates, each, respectively, arranged opposite the angle formed by the sides of the cross.

4. The combination, substantially as and for the purpose set forth, with each of the carbons, of a strip of platinum or platinized metal connected at one end to the metallic holder of the carbon and at the other bearing upon the end of the carbon.

5. The combination, substantially as and for the purpose set forth, of a disk of hard rubber resting upon a shoulder on the inner surface of the cell, a ring of metal resting upon the said disk and provided with slots for the reception of the ends of the positive plate, and a cross-shaped piece of metal resting upon the disk of hard rubber, but separated from the ring of metal, and also provided with slots for the insertion of the ends of the carbon plates.

6. The combination of the cylindrical porous cup with the zinc plates and the carbon plates, said zinc plates arranged so that their surfaces are tangent to the porous cup, substantially as and for the purpose set forth.

In testimony whereof I have signed my name to this specification, in the presence of two subscribing witnesses, on this 23d day of May, A. D. 1889.

ARCHIBALD J. MacDONALD.

Witnesses:
ALEX. L. HAYES,
H. E. TOWNSEND.